US012073423B2

United States Patent
Raghani et al.

(10) Patent No.: US 12,073,423 B2
(45) Date of Patent: Aug. 27, 2024

(54) METHODS AND APPARATUS FOR GENERATING TARGET LABELS FROM MULTI-DIMENSIONAL TIME SERIES DATA

(71) Applicant: Walmart Apollo, LLC, Bentonville, AR (US)

(72) Inventors: Pushpa Raghani, Fremont, CA (US); Vidhya Rohini Raman, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 67 days.

(21) Appl. No.: 17/163,367

(22) Filed: Jan. 30, 2021

(65) Prior Publication Data

US 2022/0245657 A1  Aug. 4, 2022

(51) Int. Cl.
  *G06Q 10/00* (2023.01)
  *G06F 16/23* (2019.01)
  *G06F 16/2457* (2019.01)
  *G06Q 30/0204* (2023.01)

(52) U.S. Cl.
  CPC ..... *G06Q 30/0204* (2013.01); *G06F 16/2379* (2019.01); *G06F 16/24578* (2019.01)

(58) Field of Classification Search
  CPC ......... G06Q 30/0204; G06Q 10/06395; G06Q 10/00; G06Q 10/02; G06Q 10/06; G06Q 10/10; G06Q 30/02; G06F 16/2379; G06F 16/24578; G05B 2219/31357
  See application file for complete search history.

(56) References Cited

U.S. PATENT DOCUMENTS

| | | | |
|---|---|---|---|
| 7,437,308 B2 | 10/2008 | Kumar et al. | |
| 8,874,477 B2* | 10/2014 | Hoffberg | G06Q 20/065 705/37 |
| 10,521,809 B2* | 12/2019 | Ray | G06Q 30/0202 |
| 2002/0078064 A1 | 6/2002 | Bisgaard-Bohr et al. | |
| 2003/0014379 A1* | 1/2003 | Saias | G06Q 10/06 706/45 |

(Continued)

OTHER PUBLICATIONS

Walker, James S., et al. "TimeClassifier: a visual analytic system for the classification of multi-dimensional time series data." The Visual Computer 31 (2015): 1067-1078. (Year: 2015).*

*Primary Examiner* — Joseph M Waesco

(74) *Attorney, Agent, or Firm* — Morgan, Lewis & Bockius LLP; Manita Rawat

(57) ABSTRACT

This application relates to apparatus and methods for generating target labels from multi-dimensional time series data. In some examples, a computing device receives parameters that correspond to each one of a plurality of sellers, and gathers a set of relevant time series metrics for each one of the sellers based on the respective seller's parameters over a time period. The computing device calculates aggregated metrics for each corresponding subperiod based on each seller's respective set of relevant time series metrics. The computing device generates seller persona clusters based at least in part on the calculated aggregated metrics for each seller. The computing device calculates a score for the generated seller persona clusters, and when the score is greater than or equal to a predetermined threshold value, generates a respective target label for each of the clusters, and applies each respective target label to the sellers within each respective cluster.

20 Claims, 6 Drawing Sheets

(56) References Cited

U.S. PATENT DOCUMENTS

| | | | |
|---|---|---|---|
| 2008/0109284 A1* | 5/2008 | Slaney | H04N 21/4751 |
| | | | 705/14.54 |
| 2011/0004509 A1* | 1/2011 | Wu | G06Q 30/0631 |
| | | | 705/26.7 |
| 2014/0278771 A1* | 9/2014 | Rehman | G06N 7/01 |
| | | | 705/7.31 |
| 2016/0364420 A1* | 12/2016 | Cronin | G06F 16/2458 |
| 2017/0147930 A1* | 5/2017 | Bellala | G06N 5/04 |
| 2017/0330264 A1* | 11/2017 | Youssef | G06F 16/24578 |
| 2018/0060696 A1* | 3/2018 | Chen | G06Q 30/0251 |
| 2018/0096417 A1* | 4/2018 | Cook | G06N 5/01 |
| 2018/0130019 A1* | 5/2018 | Kolb | G06F 16/9535 |
| 2018/0233014 A1* | 8/2018 | Wilkinson | G08B 21/0484 |
| 2018/0253654 A1* | 9/2018 | Van Osten | G06Q 10/00 |
| 2018/0268357 A1* | 9/2018 | Cantrell | G06Q 10/087 |
| 2018/0293498 A1* | 10/2018 | Campos | G06N 3/04 |
| 2018/0300677 A1* | 10/2018 | Wilkinson | G07C 9/00896 |
| 2018/0316707 A1 | 11/2018 | Dodson et al. | |
| 2019/0311301 A1* | 10/2019 | Pyati | G06F 16/901 |
| 2020/0110750 A1* | 4/2020 | Joseph | G06F 16/1734 |
| 2020/0401613 A1* | 12/2020 | Rogynskyy | G06Q 10/063114 |
| 2021/0042572 A1* | 2/2021 | Price | G06V 10/945 |

* cited by examiner

METHODS AND APPARATUS FOR GENERATING TARGET LABELS FROM MULTI-DIMENSIONAL TIME SERIES DATA

TECHNICAL FIELD

The disclosure relates generally to generating target labels from multi-dimensional time series data, and more specifically, generating said labels for sellers in a retail platform using a clustering algorithm.

BACKGROUND

Online retail platforms can include thousands of sellers, which results in a large amount of available data on those sellers and their interactions with customers. That data can be collected by retailers and used to classify sellers in order to detect risky sellers. Risky sellers can lead to negative customer experiences and cost the retailer millions of dollars in losses. For supervised learning methods such as classification, a target label is required in order to successfully perform classification on a dataset. In some domains, target labels naturally flow in due to the nature of the problem (e.g., chargebacks from customers in the ecommerce world). These chargebacks provide target labels for model training to detect risky transactions. However, for some more complex problems such as detecting fraudulent sellers in an online marketplace, there is no direct mechanism of acquiring such precise target labels. Various seller activities and other data would need to be observed over a long time period in order to detect a fraudulent seller. This activity could be related to daily sales, daily shipped orders, and defect rates in the shipped orders, each of which is time series data. However, some scalar and/or vectorial data, such as seller geolocation, seller payment details, and categories of items sold, could also be useful for detecting fraudulent sellers. As such, there are opportunities to use these data sets to generate more precise target labels.

SUMMARY

The embodiments described herein are directed to generating target labels for sellers in an online retail platform from multi-dimensional time series data, and in some embodiments, scalar and vectorial data, using a clustering algorithm. The present invention transforms the multi-dimensional time series data, and in some embodiments, vectorial data, into scalar form in order to generate seller persona clusters. Through this transformation, time series data for a particular seller is represented as a single point in N-dimensional space; N is determined by the number of subperiods within each time series and the number of aggregates obtained from each subperiod. This methodology allows for the clustering of similar data points and ultimately the clustering of similar time series using existing clustering techniques such as Gaussian Mixture Models. These clusters can then be used to generate target labels for sellers. This method of comparing time series is much more computationally efficient than existing methods of time series comparisons such as Euclidean Matching and Dynamic Time Warping Matching. The present invention is much easier to implement, and it allows for the comparison and clustering of large amounts time series data for large numbers of sellers in a highly computationally efficient manner. An added advantage of this technique is that it can include scalar and vectorial data pertaining to sellers as additional dimensions in the N-dimensional space formed by the time series data. This in turn allows for the efficient and precise classification of various types of current and future sellers with complex seller personas on a retailer's online platform.

In accordance with various embodiments, exemplary systems may be implemented in any suitable hardware or hardware and software, such as in any suitable computing device. In some embodiments, a computing device is configured to receive one or more parameters that correspond to each one of a plurality of sellers, and gather a set of relevant time series metrics for each one of the plurality of sellers based on the respective seller's one or more parameters over a time period. The time period may comprise a plurality of subperiods. The computing device may also be configured to calculate one or more aggregated metrics for each corresponding subperiod based on each seller's respective set of relevant time series metrics. Each aggregated metric may comprise at least one numeric value for the corresponding subperiod. Further, the computing device may be configured to generate a plurality of seller persona clusters based at least in part on the calculated one or more aggregated metrics for each seller. The computing device may also be configured to calculate a score for the generated plurality of seller persona clusters, and when the score is greater than or equal to a predetermined threshold value, generate a respective target label for each of the plurality of clusters, and apply each respective target label to the plurality of sellers within each respective cluster.

In some embodiments, a method is provided that includes receiving one or more parameters that correspond to each one of a plurality of sellers, and gathering a set of relevant time series metrics for each one of the plurality of sellers based on the respective seller's one or more parameters over a time period. The time period may comprise a plurality of subperiods. The method may also include calculating one or more aggregated metrics for each corresponding subperiod based on each seller's respective set of relevant time series metrics. Each aggregated metric may comprise at least one numeric value for the corresponding subperiod. Further, the method may include generating a plurality of seller persona clusters based at least in part on the calculated one or more aggregated metrics for each seller. The method may also include calculating a score for the generated plurality of seller persona clusters, and when the score is greater than or equal to a predetermined threshold value, generating a respective target label for each of the plurality of clusters, and applying each respective target label to the plurality of sellers within each respective cluster.

In some embodiments, a non-transitory computer readable medium has instructions stored thereon, where the instructions, when executed by at least one processor, cause a computing device to perform operations that include receiving one or more parameters that correspond to each one of a plurality of sellers, and gathering a set of relevant time series metrics for each one of the plurality of sellers based on the respective seller's one or more parameters over a time period. The time period may comprise a plurality of subperiods. The operations may also include calculating one or more aggregated metrics for each corresponding subperiod based on each seller's respective set of relevant time series metrics. Each aggregated metric may comprise at least one numeric value for the corresponding subperiod. Further, the operations may include generating a plurality of seller persona clusters based at least in part on the calculated one or more aggregated metrics for each seller. The operations may also include calculating a score for the generated plurality of seller persona clusters, and when the score is greater than or equal to a predetermined threshold value, generating a respective target label for each of the plurality of clusters, and applying each respective target label to the plurality of sellers within each respective cluster.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein.

DETAILED DESCRIPTION

Figure 1:
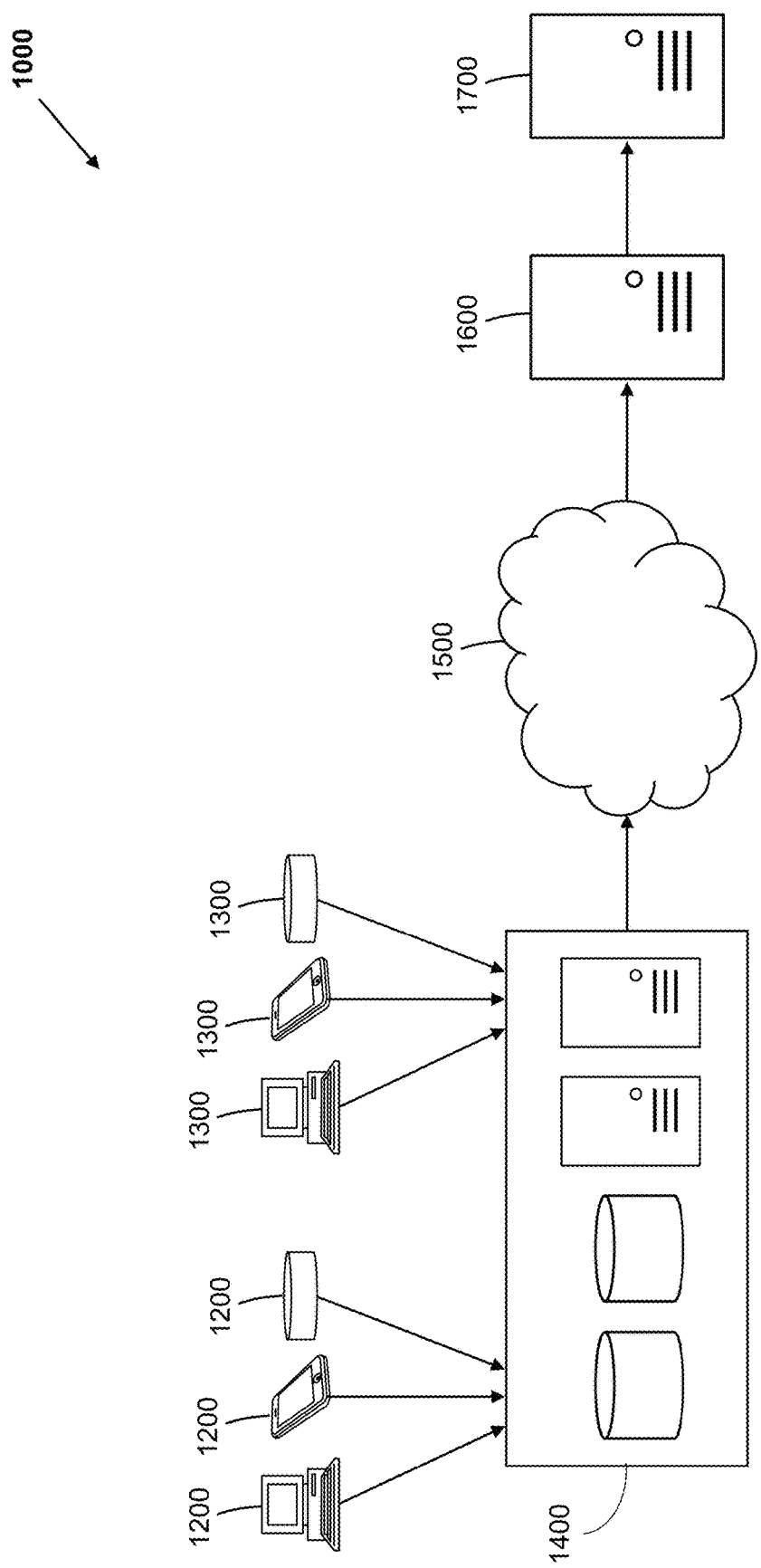
FIG. 1 is a block diagram of a target label generation system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a target label generation system 1000. The system 1000 comprises one or more customer devices 1200 and one or more seller devices 1300. The system 1000 further comprises a retailer subsystem 1400, which gathers data from the customer devices 1200 and the seller devices 1300. The customer devices 1200 provide data on any customer interaction or transaction with the retailer subsystem 1400 such as placed orders, customer complaints or disputes, and refunds requests. The seller devices 1300 provide seller data such as seller profile information, seller account information, and seller geolocation information. The retailer subsystem 1400 may contain a plurality of databases and servers for gathering the customer and seller data.

The system 1000 further comprises a cloud system 1500, which comprises a gateway and database server system that processes and feeds data gathered by the retailer subsystem 1400 into the evaluation system 1600. The system 1000 further comprises an evaluation system 1600 and a tracking system 1700, both of which may comprise a server. The evaluation system 1600 is described in further detail below with respect to FIG. 2. The tracking system 1700 enables retailers to monitor the output of the evaluation system 1600 in order to further analyze and identify opportunities for improvement in target label generation.

Figure 2:
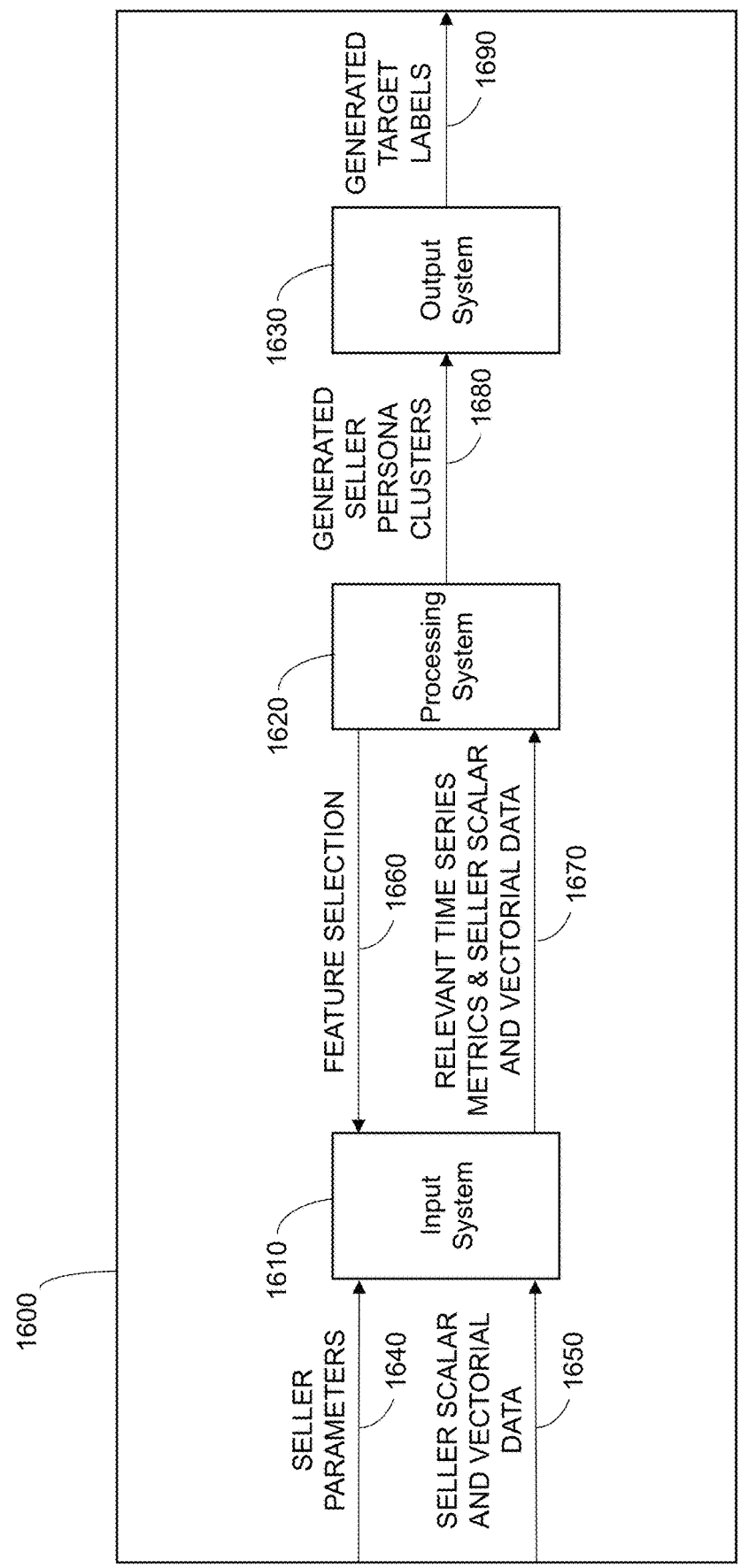
FIG. 2 is a block diagram of the evaluation system of the target label generation system of FIG. 1 in accordance with some embodiments.

FIG. 2 illustrates a block diagram of the evaluation system 1600. The evaluation system 1600 comprises an input system 1610, a processing system 1620, and an output system 1630. The input system 1610 may receive one or more seller parameters 1640 for each one of a plurality of sellers from the cloud system 1500. The seller parameters 1640 may include time series data on seller events. The seller parameters 1640 may include, but are not limited to, one or more of the number of seller transactions, number of customer complaints or disputes, number of refunds, number of customer chargebacks, number of shipping delays, number of reported product defects, ratio of customer refunds to sales, and/or gross merchandise value (GMV). In some embodiments, the input system 1610 may receive seller scalar and vectorial data 1650 for each one of the plurality of sellers from the cloud system 1500. In some embodiments, seller scalar data may include the categories of items sold and seller payment account information. In some embodiments, seller vectorial data may include seller geolocation. The input system 1610 generates different sets of time series metrics based on the received seller parameters 1640 for each seller. After the input system 1610 has generated these time series metrics, the processing system 1620 may make a feature selection 1660. The processing system 1620 may transmit the feature selection 1660 to the input system 1610. The feature selection 1660 may indicate which time series metrics and, in some embodiments, seller scalar and vectorial data 1650 are relevant for generating the seller persona clusters. The input system 1610 may then gather and transmit relevant time series metrics and seller scalar and vectorial data 1670 to the processing system 1620. In some embodiments, the input system 1610 may only gather and transmit relevant time series metrics to the processing system 1620.

The processing system 1620 may generate seller persona clusters (as explained in further detail below with respect to FIG. 3) using a clustering algorithm and may transmit the generated seller persona clusters 1680 to the output system 1630. The output system 1630 may generate target labels (as explained in further detail below with respect to FIG. 3) and may transmit the generated target labels 1690 to the tracking system 1700.

Figure 3:
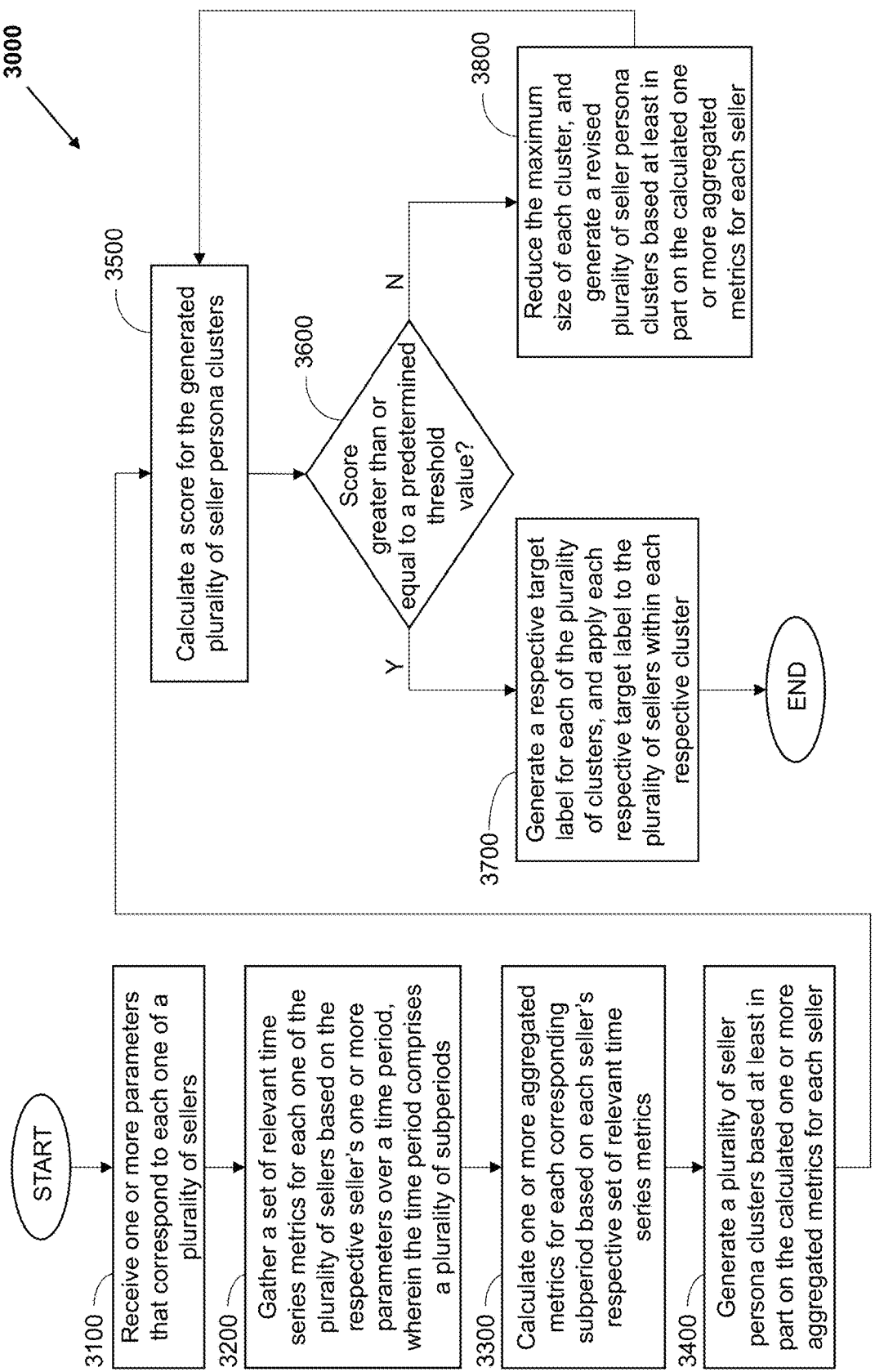
FIG. 3 is a flowchart of an example method that can be carried out by the target label generation system of FIG. 1 in accordance with some embodiments.

FIG. 3 illustrates a flowchart of an example method of target label generation 3000 that can be carried out by the target label generation system 1000 of FIG. 1. Beginning at step 3100, a computing device, such as the evaluation system 1600, receives one or more parameters that correspond to each one of a plurality of sellers (e.g., seller parameters 1640). These parameters may include, but are not limited to, any of the seller parameters described above with respect to FIG. 2. For example, the parameters may include the number of refunds for each of the plurality of sellers and the amount of sales for each of the plurality of sellers. The computing device (e.g., evaluation system 1600 using its input system 1610) may generate time series metrics for each one of the plurality of sellers based on the respective seller's one or more parameters over a time period. In some embodiments, the computing device may also receive scalar and vectorial data for each one of the plurality of sellers (e.g., seller scalar and vectorial data 1650). For example, the scalar data may include the categories of items sold for each seller (e.g., housewares) and the vectorial data may include the geolocation for each seller (e.g., San Francisco, California). In some embodiments, input system 1610 may only transmit relevant time series metrics and seller scalar and vectorial data 1670 to the processing system 1620, as illustrated in FIG. 2.

At step 3200, the computing device (e.g., evaluation system 1600 using its input system 1610) gathers a set of relevant time series metrics for each one of the plurality of sellers based on the respective seller's one or more parameters over a time period (e.g., 8 weeks). The time period comprises a plurality of subperiods. For example, the input system 1610 may gather the number of refunds each day for each of the plurality of sellers and the amount of sales each day for each of the plurality of sellers over a specific 8-week time period, where the time period comprises a plurality subperiods (e.g., five subperiods comprising the last 7, 14, 21, 28, and 56 days of the 8-week time period). The input system 1610 may gather this set of relevant time series metrics in response to a feature selection 1660 from the processing system 1620. The feature selection 1660 may indicate that only the number of refunds and the amount of sales during the specific 8-week period, the categories of items sold for each seller, and the geolocation for each seller are relevant for generating target labels. The input system 1610 may then transmit the relevant time series metrics (number of refunds and the amount of sales each day during the specific 8-week period), relevant scalar data (categories of items sold), and relevant vectorial data (geolocation) for each seller to the processing system 1620.

Figure 4A:
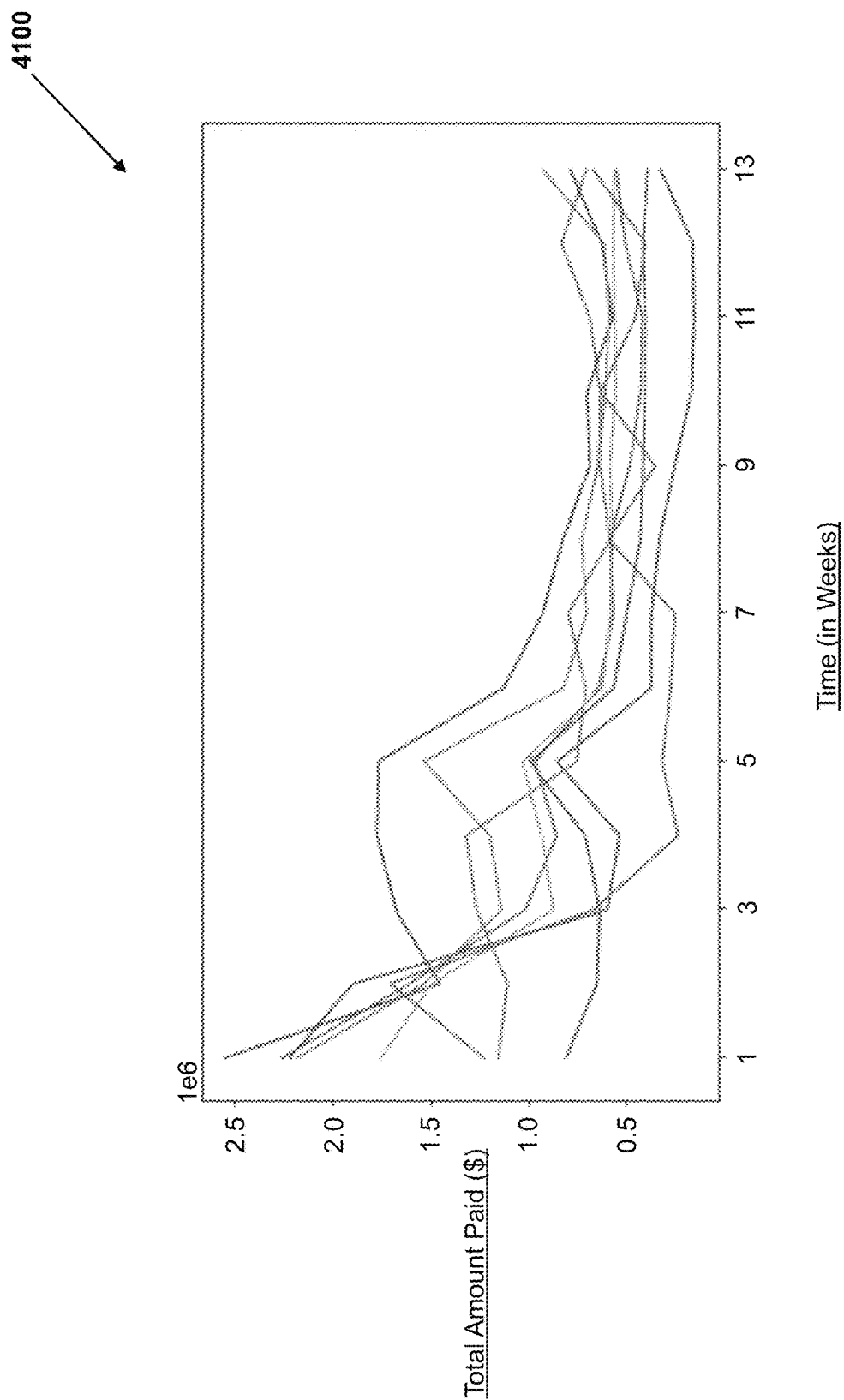
FIG. 4A is an exemplary graph of time series metrics for an 8-seller persona cluster in accordance with some embodiments.
Figure 4B:
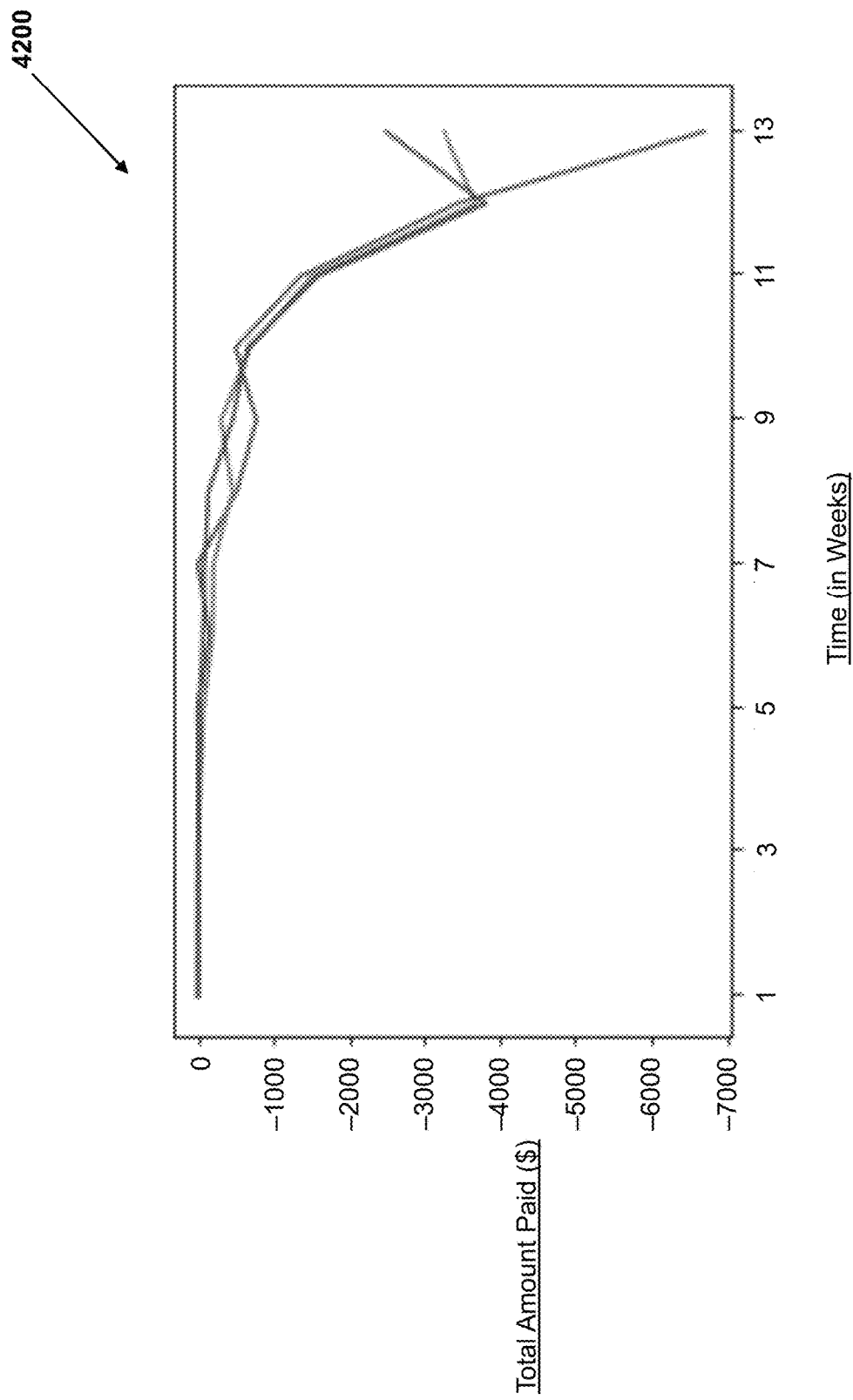
FIG. 4B is an exemplary graph of time series metrics for a 3-seller persona cluster in accordance with some embodiments.
Figure 4C:
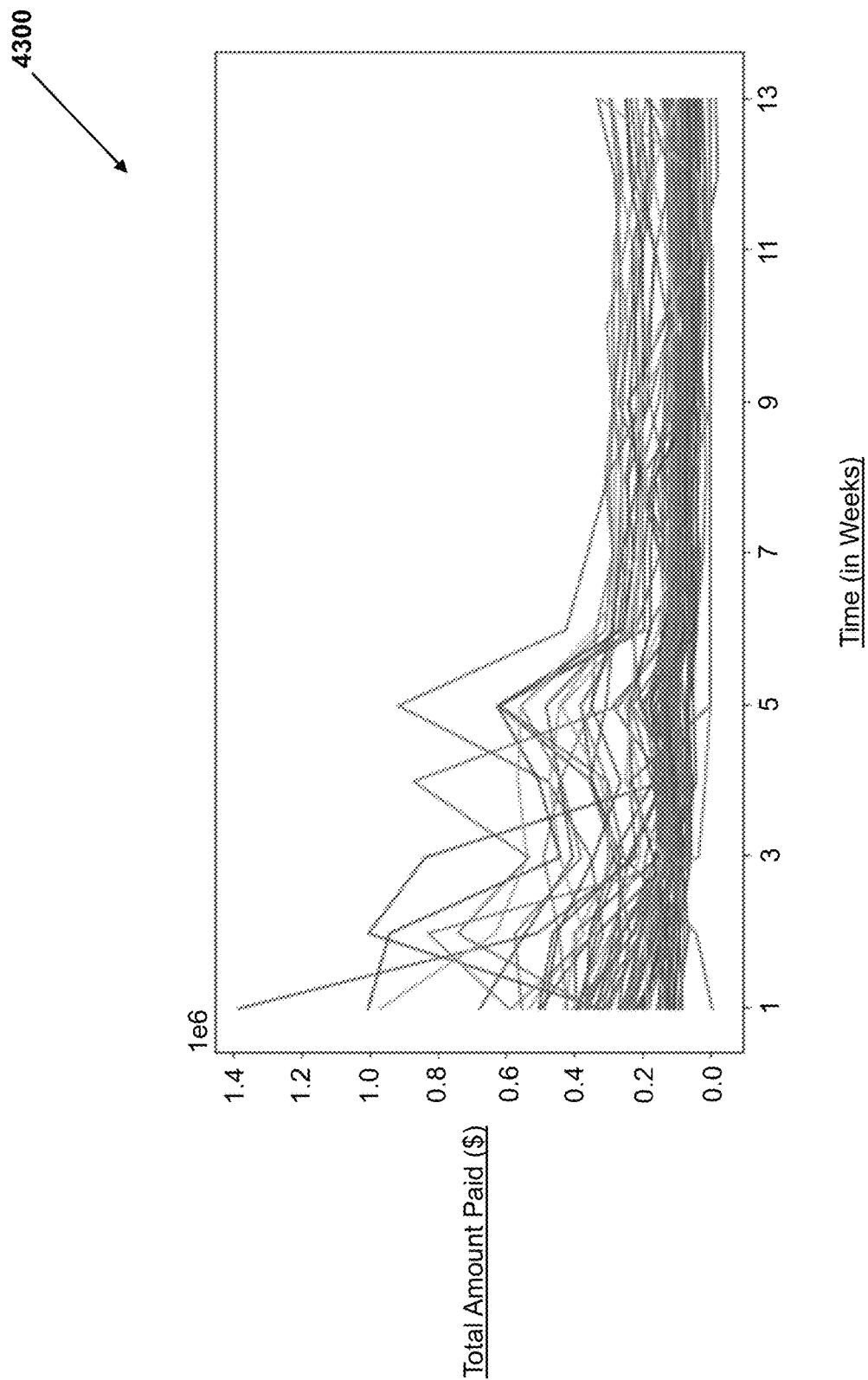
FIG. 4C is an exemplary graph of time series metrics for a 69-seller persona cluster in accordance with some embodiments.

In some embodiments, the subperiods may be 7-day, 14-day, 21-day, 28-day, or 56-day periods. In some embodiments, the time period may be greater than or equal to one year in order to observe seasonalities. In some embodiments, the time period may be long enough to include at least one full periodicity of a cycle (e.g., a multi-year period) in order to observe cyclical trends. Graphical representations of exemplary time series metrics (e.g., total amount paid to each seller by the online retailer over a 13-week time period) are illustrated in FIGS. 4A-4C, which are described in further detail below.

Proceeding to step 3300, the computing device (e.g., evaluation system 1600 using its processing system 1620) calculates one or more aggregated metrics for each corresponding subperiod based on each seller's respective set of relevant time series metrics. Each aggregated metric comprises at least one numeric value for the corresponding subperiod. In some embodiments, the numeric value may be a minimum, maximum, average, standard deviation, or sum of the relevant time series metrics during a given subperiod. For example, the processing system 1620 may calculate the minimum, maximum, average, standard deviation, and sum of the number of refunds for each seller during each subperiod (e.g., during each of the last 7, 14, 21, 28, and 56 days) of an 8-week time period based on that seller's set of relevant time series metrics. In some embodiments, the numeric value may be the slope or curvature of a time series metric plot. For example, if the time series metrics include sales during a specific time period, the computing device (e.g., evaluation system 1600 using its processing system 1620) may calculate the velocity of change in the sales and the measure of fluctuations in the sales (i.e., how long the seller is staying at a minimum or maximum).

At step 3400, the computing device (e.g., evaluation system 1600 using its processing system 1620) generates a plurality of seller persona clusters (e.g., generated seller persona clusters 1680) based at least in part on the calculated one or more aggregated metrics for each seller. The plurality of seller persona clusters is generated using a clustering algorithm. In some embodiments, the computing device may generate the plurality of seller persona clusters based on the calculated one or more aggregated metrics for each seller and the received scalar and vectorial data for each seller. In some embodiments, the plurality of seller persona clusters is generated using a Gaussian Mixture Model (GMM) clustering technique. In the refund example described above, the evaluation system 1600 may input the calculated aggregated metrics (i.e., the minimum, maximum, average, standard deviation, and sum of the number of refunds) for each of the 5 subperiods (where the subperiods are the last 7, 14, 21, 28, and 56 days of the 8-week time period) for each seller into a clustering algorithm, such as an algorithm used in the GMM clustering technique. In using a GMM clustering technique, the aggregated metrics for each seller in one of the 5 subperiods would be represented by a single point in 5-dimensional space. Further, in using a GMM clustering technique, the aggregated metrics for each seller over all of the 5 subperiods would be represented by a single point in 25-dimensional space, making it much easier and more computationally efficient to compare and cluster sellers than it would be using traditional methods such as Euclidean Matching or Dynamic Time Warping Matching, which require a comparison of no more than two-sets of time series metrics at a time.

In some embodiments, the evaluation system 1600 may input additional aggregated metrics (e.g., the minimum, maximum, average, standard deviation, and sum of the amount of sales) for each of the 5 subperiods for each seller into the clustering algorithm. Adding such additional aggregated metrics on the amount of sales would add 25 additional dimensions to the 25-dimensional space described above, such that the aggregated metrics for each seller over all of the 5 subperiods would be represented by a single point in 50-dimensional space. In some embodiments, the evaluation system 1600 may also input relevant scalar and vectorial data (such as those examples described above) for each seller into the clustering algorithm. Using a clustering algorithm like an algorithm used in the GMM clustering technique allows for the comparison and clustering of large amounts of varying types of data (e.g., time series, scalar, and vectorial data) for large numbers of sellers in a highly computationally efficient manner. This in turn allows for the efficient and precise classification of various types of current and future sellers with complex personas on a retailer's online platform. This is invaluable to online retailers who have large numbers of sellers on their online platforms and a need to classify those sellers (e.g., for early detection of fraudulent sellers in an online marketplace).

At step 3500, the computing device (e.g., evaluation system 1600 using its processing system 1620) calculates a score for the generated plurality of seller persona clusters. This score is an overall score for all of the seller persona clusters, and it indicates how well or poorly the clusters are separated. If the score is low, it indicates that the seller persona clusters are poorly separated, and some sellers may have been assigned to a seller persona cluster in which other sellers in the cluster do not exhibit similar seller patterns. A low score may indicate that one or more sellers in a seller persona cluster may have a seller persona that is more similar to those of sellers in another seller persona cluster (different from the one the seller was assigned to). If the score is high, it indicates that the seller persona clusters are well separated, and each seller has been assigned to a seller persona cluster in which other sellers exhibit similar seller patterns, which a target label (e.g., seasonal seller) could accurately describe. In some embodiments, this score may be a silhouette score that ranges between −1 and 1, where a score near 1 indicates that the seller persona clusters are well separated and each seller accurately belongs to a given cluster, a score close to −1 indicates that some sellers have been assigned to the wrong cluster, and a score near 0 indicates some overlapping clusters.

At step 3600, the computing device (e.g., evaluation system 1600 using its processing system 1620) determines whether the score is greater than or equal to a predetermined threshold value. In some embodiments, the predetermined threshold value is 0.6. When the score is determined to be greater than or equal to the predetermined threshold value at step 3600, the computing device proceeds to step 3700.

At step 3700, the computing device (e.g., evaluation system 1600 using its output system 1630) generates a respective target label for each of the plurality of clusters (e.g., generated target labels 1690), and the computing device applies each respective target label to the plurality of sellers within each respective cluster. The target labels may identify a seller persona attributable to the sellers in each of the plurality of clusters. Target labels may be, but are not limited to, any one of the following: bad seller, high volume seller, seasonal seller, high customer dispute seller, and fraudulent seller. The requirements for each target label may be stored in the tracking system 1700. A bad seller target label may be applied to sellers with declining sales activity and increased returns activity, as these would cause a retailer to incur more cumulative losses over time. A high volume seller target label may be applied to sellers with very high sales activity and sales potential. A seasonal seller target label may be applied to sellers with high sales numbers during holiday period(s) but low sales during other times and lagging customer refund trends. A high customer dispute seller target label may be applied to sellers with very high customer refunds to sales ratios (relative to other sellers). A fraudulent seller target label may be applied to sellers with high numbers of refund requests, a sudden spike in sales, and missed order deliveries. In some embodiments, the computing device may identify seller patterns (e.g., a specific or threshold rate of declining sales activity and number of returns during a given time period) within a selected seller persona cluster and apply the target label of the selected seller persona cluster (e.g., bad seller) to a future seller exhibiting at least one of the identified seller patterns. The method then ends after step 3700.

When the score is determined to be less than the predetermined threshold value at step 3600, the computing device proceeds to step 3800. At step 3800, the computing device (e.g., evaluation system 1600 using processing system 1620) reduces the maximum size of each cluster, and the computing device generates a revised plurality of seller persona clusters based at least in part on the calculated one or more aggregated metrics for each seller. In some embodiments, methods of reducing the maximum size of each cluster may include removing the aggregated metrics for outlier sellers in various clusters from the input to the clustering algorithm. In some embodiments, the computing device may remove the aggregated metrics for sellers in a smaller size seller persona cluster from the input to the clustering algorithm in order to correct for a score lower than the predetermined threshold. In some embodiments, the computing device may perform feature transformations (e.g., log transformations, square root transformations) or rescaling (e.g. normalizing) to correct for a score lower than the predetermined threshold. The computing device then proceeds back to step 3500, which is described above.

FIGS. 4A-4C illustrate graphs of exemplary time series metrics over a 13-week time period for three different generated seller persona clusters 1680. These graphs show the total amount paid (in U.S. dollars) to each seller by a retailer over a time period of 13 weeks. FIG. 4A illustrates a graph 4100 of time series metrics for an 8-seller persona cluster. FIG. 4B illustrates a graph 4200 of time series metrics for a 3-seller persona cluster. FIG. 4C illustrates a graph 4300 of time series metrics for a 69-seller persona cluster. As evidenced by FIGS. 4A-4C, the sellers in each seller persona cluster exhibit similar seller patterns, which in these exemplary cases are trends in total amount paid by a retailer over time. In some embodiments, trends (or patterns) in time series metrics may be characterized as: constant and stable, cyclic, increasing trend, decreasing trend, upward shift, or downward shift.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:
1. A system comprising:
   a computing device including a processor, an input system, a processing system and an output system, wherein:
   the input system is configured to:

receive one or more parameters that correspond to each one of a plurality of sellers, generate a plurality of time series metrics based on the one or more parameters, receive scalar and vectorial data for each one of the plurality of sellers, wherein the scalar and vectorial data for each seller includes one or more of the following information of the respective seller: geolocation, payment account information, or categories of items sold;

the processing system is configured to:
perform a feature selection based on characteristics of the plurality of sellers,
transmit the feature selection as a feedback back to the input system;

the input system is further configured to:
receive the feedback of the feature selection from the processing system,
gather, according to the feature selection from the processing system, a set of relevant scalar and vectorial data among the scalar and vectorial data for each one of the plurality of sellers, and
gather, according to the feature selection from the processing system, a set of relevant time series metrics among the plurality of time series metrics for each one of the plurality of sellers based on the respective seller's one or more parameters over a time period, wherein the time period comprises a plurality of subperiods;

the processing system is further configured to:
calculate one or more aggregated metrics for each corresponding subperiod based on each seller's respective set of relevant time series metrics, wherein each aggregated metric comprises at least one numeric value for the corresponding subperiod,
cluster the plurality of sellers using a Gaussian Mixture Model to generate a plurality of seller persona clusters based at least in part on the calculated one or more aggregated metrics for each seller and each seller's respective set of relevant scalar and vectorial data, wherein each of the plurality of seller persona clusters includes a group of sellers among the plurality of sellers,
calculate an overall score for all of the generated plurality of seller persona clusters, wherein the overall score indicates how well the seller persona clusters are separated, and
transmit the plurality of seller persona clusters to the output system when the overall score is greater than or equal to a predetermined threshold value; the output system is configured to:
receive the plurality of seller persona clusters from the processing system,
generate a respective target label for each of the plurality of seller persona clusters, and
apply each respective target label to the group of sellers within each respective seller persona cluster to generate training data for a supervised machine learning model, wherein the generated target labels comprise: bad seller, high volume seller, seasonal seller, high customer dispute seller, and fraudulent seller; and the processor is configured to:
train the supervised machine learning model based on the training data, and
apply the trained supervised machine learning model to classify and detect sellers on a retail platform.

2. The system of claim 1, wherein the predetermined threshold value is 0.6.

3. The system of claim 1, wherein the computing device is further configured to receive scalar and vectorial data for each one of the plurality of sellers, and further configured to generate the plurality of seller persona clusters based on the calculated one or more aggregated metrics for each seller and the received scalar and vectorial data for each seller.

4. The system of claim 3, wherein the scalar and vectorial data for each seller includes one or more of the following information of the respective seller: geolocation, payment account information, or categories of items sold.

5. The system of claim 1, wherein the received one or more parameters include one or more of the following: number of seller transactions, number of customer complaints or disputes, number of refunds, number of customer chargebacks, number of shipping delays, number of reported product defects, ratio of customer refunds to sales, or gross merchandise value.

6. The system of claim 1, wherein the respective target label is bad seller, high volume seller, seasonal seller, high customer dispute seller, or fraudulent seller.

7. The system of claim 1, wherein:
the plurality of subperiods includes at least 5 subperiods;
there are at least 5 aggregated metrics for each of the plurality of subperiods; and
the at least 5 aggregated metrics for each seller over all of the at least 5 subperiods are represented using the Gaussian Mixture Model during the clustering by a single point in a space having at least 25 dimensions.

8. The system of claim 1, wherein the time period is greater than or equal to one year.

9. The system of claim 1, wherein the computing device is further configured to:
when the overall score is less than the predetermined threshold value, reduce a maximum size of each cluster; and
generate a revised plurality of seller persona clusters based at least in part on the calculated one or more aggregated metrics for each seller.

10. The system of claim 1, wherein the computing device is further configured to:
identify seller patterns within a selected seller persona cluster; and
apply the target label of the selected seller persona cluster to a future seller exhibiting at least one of the identified seller patterns.

11. A method comprising:
receiving, by an input system, one or more parameters that correspond to each one of a plurality of sellers;
generating, by the input system, a plurality of time series metrics based on the one or more parameters;
receiving, by the input system, scalar and vectorial data for each one of the plurality of sellers, wherein the scalar and vectorial data for each seller includes one or more of the following information of the respective seller: geolocation, payment account information, or categories of items sold;
performing, by a processing system, a feature selection based on characteristics of the plurality of sellers;
transmitting, by the processing system, the feature selection as a feedback back to the input system;
receiving, by the input system from the processing system, the feedback of the feature selection;
gathering, by the input system according to the feature selection from the processing system, a set of relevant scalar and vectorial data among the scalar and vectorial data for each one of the plurality of sellers;

gathering, by the input system according to the feature selection from the processing system, a set of relevant time series metrics among the plurality of time series metrics for each one of the plurality of sellers based on the respective seller's one or more parameters over a time period, wherein the time period comprises a plurality of subperiods;

calculating, by the processing system, one or more aggregated metrics for each corresponding subperiod based on each seller's respective set of relevant time series metrics, wherein each aggregated metric comprises at least one numeric value for the corresponding subperiod;

clustering, by the processing system, the plurality of sellers using a Gaussian Mixture Model to generate a plurality of seller persona clusters based at least in part on the calculated one or more aggregated metrics for each seller and each seller's respective set of relevant scalar and vectorial data, wherein each of the plurality of seller persona clusters includes a group of sellers among the plurality of sellers;

calculating, by the processing system, an overall score for all of the generated plurality of seller persona clusters, wherein the overall score indicates how well the seller persona clusters are separated;

transmitting, by the processing system, the plurality of seller persona clusters to an output system when the overall score is greater than or equal to a predetermined threshold value;

generating, by the output system, a respective target label for each of the plurality of seller persona clusters;

applying, by the output system, each respective target label to the group of sellers within each respective seller persona cluster to generate training data for a supervised machine learning model, wherein the generated target labels comprise: bad seller, high volume seller, seasonal seller, high customer dispute seller, and fraudulent seller;

training, by a processor, the supervised machine learning model based on the training data; and applying, by the processor, the trained supervised machine learning model to classify and detect sellers on a retail platform.

12. The method of claim 11 wherein:
the plurality of subperiods includes at least 5 subperiods;
there are at least 5 aggregated metrics for each of the plurality of subperiods; and
the at least 5 aggregated metrics for each seller over all of the at least 5 subperiods are represented using the Gaussian Mixture Model during the clustering by a single point in a space having at least 25 dimensions.

13. The method of claim 11 further comprising:
receiving scalar and vectorial data for each one of the plurality of sellers; and
generating the plurality of seller persona clusters based on the calculated one or more aggregated metrics for each seller and the received scalar and vectorial data for each seller.

14. The method of claim 11 further comprising:
when the overall score is less than the predetermined threshold value, reducing a maximum size of each cluster; and
generating a revised plurality of seller persona clusters based at least in part on the calculated one or more aggregated metrics for each seller.

15. The method of claim 11 further comprising:
identifying seller patterns within a selected seller persona cluster; and
applying the target label of the selected seller persona cluster to a future seller exhibiting at least one of the identified seller patterns.

16. A non-transitory computer readable medium having instructions stored thereon, wherein the instructions, when executed by at least one processor, cause a device to perform operations comprising:

receiving, by an input system, one or more parameters that correspond to each one of a plurality of sellers;

generating, by the input system, a plurality of time series metrics based on the one or more parameters;

receiving, by the input system, scalar and vectorial data for each one of the plurality of sellers, wherein the scalar and vectorial data for each seller includes one or more of the following information of the respective seller: geolocation, payment account information, or categories of items sold;

performing, by a processing system, a feature selection based on characteristics of the plurality of sellers;

transmitting, by the processing system, the feature selection as a feedback back to the input system;

receiving, by the input system from the processing system, the feedback of the feature selection;

gathering, by the input system according to the feature selection from the processing system, a set of relevant scalar and vectorial data among the scalar and vectorial data for each one of the plurality of sellers;

gathering, by the input system according to the feature selection from the processing system, a set of relevant time series metrics among the plurality of time series metrics for each one of the plurality of sellers based on the respective seller's one or more parameters over a time period, wherein the time period comprises a plurality of subperiods;

calculating, by the processing system, one or more aggregated metrics for each corresponding subperiod based on each seller's respective set of relevant time series metrics, wherein each aggregated metric comprises at least one numeric value for the corresponding subperiod;

clustering, by the processing system, the plurality of sellers using a Gaussian Mixture Model to generate a plurality of seller persona clusters based at least in part on the calculated one or more aggregated metrics for each seller and each seller's respective set of relevant scalar and vectorial data, wherein each of the plurality of seller persona clusters includes a group of sellers among the plurality of sellers;

calculating, by the processing system, an overall score for all of the generated plurality of seller persona clusters, wherein the overall score indicates how well the seller persona clusters are separated;

transmitting, by the processing system, the plurality of seller persona clusters to an output system when the overall score is greater than or equal to a predetermined threshold value;

generating, by the output system, a respective target label for each of the plurality of seller persona clusters;

applying, by the output system, each respective target label to the group of sellers within each respective seller persona cluster to generate training data for a supervised machine learning model, wherein the generated target labels comprise: bad seller, high volume seller, seasonal seller, high customer dispute seller, and fraudulent seller;

training, by a processor, the supervised machine learning model based on the training data; and applying, by the processor, the trained supervised machine learning model to classify and detect sellers on a retail platform.

17. The non-transitory computer readable medium of claim 16, wherein:

the plurality of subperiods includes at least 5 subperiods;

there are at least 5 aggregated metrics for each of the plurality of subperiods; and the at least 5 aggregated metrics for each seller over all of the at least 5 subperiods are represented using the Gaussian Mixture Model during the clustering by a single point in a space having at least 25 dimensions.

18. The non-transitory computer readable medium of claim 16, further comprising instructions stored thereon that, when executed by at least one processor, further cause the device to perform operations comprising:

receiving scalar and vectorial data for each one of the plurality of sellers; and generating the plurality of seller persona clusters based on the calculated one or more aggregated metrics for each seller and the received scalar and vectorial data for each seller.

19. The non-transitory computer readable medium of claim 16, further comprising instructions stored thereon that, when executed by at least one processor, further cause the device to perform operations comprising:

when the overall score is less than the predetermined threshold value, reducing a maximum size of each cluster; and generating a revised plurality of seller persona clusters based at least in part on the calculated one or more aggregated metrics for each seller.

20. The non-transitory computer readable medium of claim 16, further comprising instructions stored thereon that, when executed by at least one processor, further cause the device to perform operations comprising:

identifying seller patterns within a selected seller persona cluster; and applying the target label of the selected seller persona cluster to a future seller exhibiting at least one of the identified seller patterns.

* * * * *